United States Patent
Karlsson et al.

(10) Patent No.: US 9,124,190 B2
(45) Date of Patent: Sep. 1, 2015

(54) ISOLATED SWITCHED MODE POWER SUPPLY

(75) Inventors: Magnus Karlsson, Oskarshamn (SE); Jonas Malmberg, Färjestaden (SE); Oscar Persson, Kalmar (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/820,329

(22) PCT Filed: Sep. 2, 2010

(86) PCT No.: PCT/EP2010/062874
§ 371 (c)(1),
(2), (4) Date: Mar. 1, 2013

(87) PCT Pub. No.: WO2012/028189
PCT Pub. Date: Mar. 8, 2012

(65) Prior Publication Data
US 2013/0155727 A1    Jun. 20, 2013

(51) Int. Cl.
*H02M 3/335* (2006.01)
*H02M 3/156* (2006.01)
*H02M 1/00* (2007.01)

(52) U.S. Cl.
CPC .......... *H02M 3/33546* (2013.01); *H02M 3/156* (2013.01); *H02M 3/335* (2013.01);
(Continued)

(58) Field of Classification Search
CPC ..... H02M 3/156; H02M 3/335; H02M 7/797; Y02B 70/1491; Y02B 70/1475
USPC ......... 363/21.04, 15, 21.06, 21.14, 21.15, 48, 363/89, 21.01, 124, 19, 21.05, 20, 21.1, 363/21.11, 21.12, 21.07, 21.13; 323/285
See application file for complete search history.

(56) References Cited

U.S. PATENT DOCUMENTS 4,931,716 A   6/1990   Jovanovic et al.
5,907,481 A   5/1999   Svardsjo
(Continued)

FOREIGN PATENT DOCUMENTS

EP    0 833 430 A2    4/1998

OTHER PUBLICATIONS

Kjaer, et al. Power Inverter Topologies for Photovoltaic Modules—A Review. Conference Record of the 2002 IEEE Industry Application Conference: 37$^{th}$ IAS Annual Meeting. Oct. 13-18, 2002.
(Continued)

*Primary Examiner* — Jessica Han
*Assistant Examiner* — Trinh Dang (57) ABSTRACT

An isolated switched mode power supply comprises a transformer, with primary and secondary windings, and a rectification network connected to the secondary winding. The rectification network and the transformer are arranged such that, during a free-wheeling period of operation of the switched mode power supply, a magnetic flux from a first portion of a secondary winding of the transformer substantially cancels a magnetic flux from a second portion of the secondary winding between the first and second portions of the secondary winding. Additionally, a secondary side circuit connected to the secondary winding comprises a switching device, which is connected to a center-tap, provided between the first and second portions of the secondary winding, and an output of the rectification network so as to conduct at least a part of a free-wheeling current flowing in the secondary side circuit during the free-wheeling period.

11 Claims, 12 Drawing Sheets (52) U.S. Cl.
CPC .. *H02M3/33592* (2013.01); *H02M 2001/0048* (2013.01); *Y02B 70/1475* (2013.01); *Y02B 70/1491* (2013.01)

(56) References Cited

U.S. PATENT DOCUMENTS

| | | |
|---|---|---|
| 5,923,547 A | 7/1999 | Mao |
| 5,973,939 A | 10/1999 | Tan |
| 6,246,592 B1 | 6/2001 | Balogh et al. |
| 6,473,323 B1 * | 10/2002 | Taurand ............... 363/89 |
| 7,471,524 B1 | 12/2008 | Batarseh |
| 2005/0099827 A1 * | 5/2005 | Sase et al. ............ 363/16 |
| 2009/0213622 A1 * | 8/2009 | Cesnak et al. ......... 363/17 |
| 2009/0213623 A1 | 8/2009 | Yang |
| 2009/0261790 A1 | 10/2009 | Arduni |
| 2010/0165667 A1 * | 7/2010 | Artusi et al. .......... 363/21.01 |
| 2011/0037319 A1 * | 2/2011 | Matsui et al. ......... 307/43 |

OTHER PUBLICATIONS

Erickson, R. W., and D. Maksimovic, "Fundamentals of Power Electronics," 2nd Ed., Kluwer Academic Publisher, pp. 147-171.

* cited by examiner

ISOLATED SWITCHED MODE POWER SUPPLY

TECHNICAL FIELD

The present invention generally relates to the field of isolated switched mode power supplies (sometimes referred to as isolated switch mode power supplies or isolated switching mode power supplies) and more specifically to an isolated switched mode power supply provided with a switching device for reducing the power loss therein.

BACKGROUND

The switched mode power supply (SMPS) is a well-known type of power converter having a diverse range of applications by virtue of its small size and weight and high efficiency, for example in personal computers and portable electronic devices such as cell phones. An SMPS achieves these advantages by switching a switching element such as power MOSFET at a high frequency (usually tens to hundreds of kHz), with the frequency or duty cycle of the switching being adjusted using a feedback signal to convert an input voltage to a desired output voltage. An SMPS may take the form of a rectifier (AC/DC converter), a DC/DC converter, a frequency changer (AC/AC) or an inverter (DC/AC).

Figure 1:
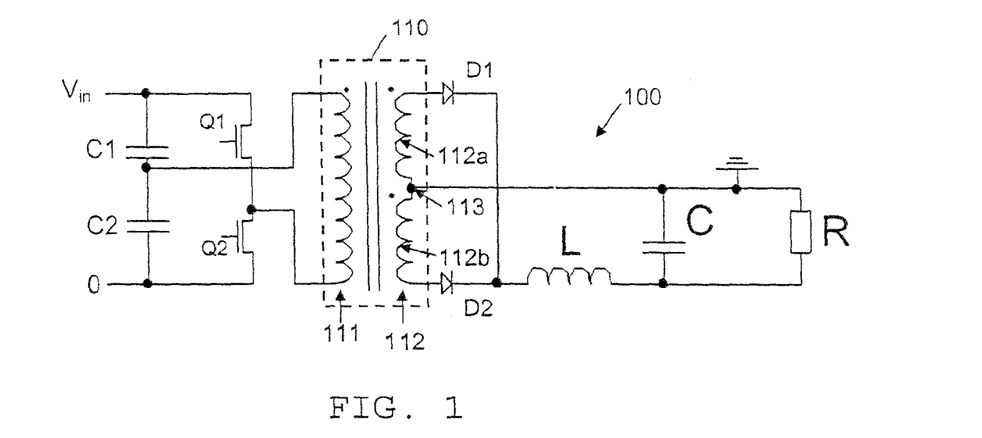
FIG. 1 shows a background example SMPS circuit having a centre-tapped secondary side transformer winding and diode rectification.

FIG. 1 shows a background example of an isolated SMPS, i.e. an SMPS which converts an input voltage $V_{in}$ to an output voltage $V_{out}$ whilst isolating the input from the output through a transformer. The SMPS 100 is provided in the form of a DC-to-DC converter which has on its primary side a half-bridge arrangement comprising two transistors, Q1 and Q2 (which may, for example, be field-effect transistors such as MOSFETs or IGBTs) and two capacitors, C1 and C2, which are connected between the power supply's inputs and to the primary winding 111 of the isolation transformer 110, as shown. The use of only two transistors to handle currents on the primary side makes the half-bridge configuration best suited to low-power applications requiring a low parts count. Although a half-bridge configuration is employed in the present example, other well-known topologies may alternatively be used on the primary side. For example, a full-bridge configuration with four transistors may be more suitable for higher-power applications. Alternatively, a push-pull arrangement can be used. In all these configurations, the switching of the transistors is controlled by a controller circuit (not shown).

FIG. 1 also shows a standard topology on the secondary side of the isolated SMPS 100, which includes a rectifying circuit and an LC filter connected to a load R. The inductor L of the LC filter is connected to the secondary winding 112 of the transformer 110. A centre-tap 113 referenced to ground is provided between a first portion 112a of the secondary winding 112 having $n_2$ turns and a second portion 112b of the winding 112 also having $n_2$ turns. In the present example, the rectifying network employs two diodes, D1 and D2, to yield full-wave rectification of the voltage induced in the secondary winding 112.

Figure 2:
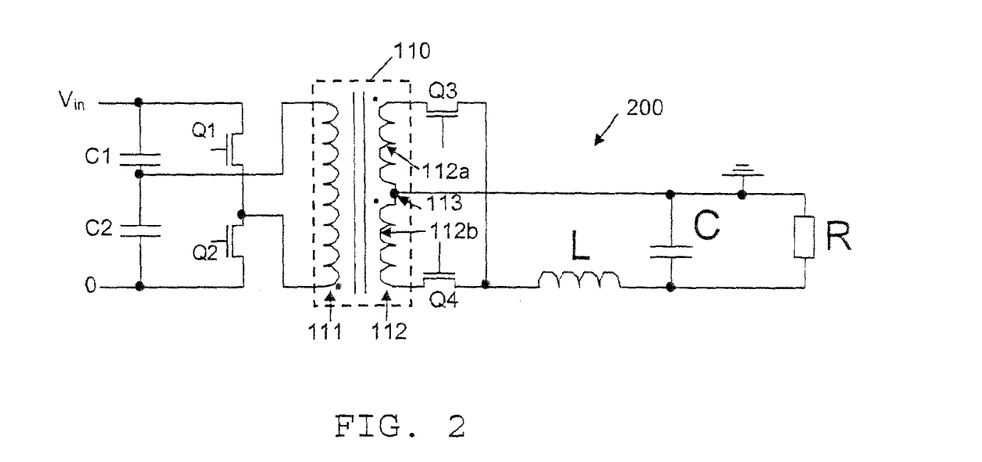
FIG. 2 illustrates a variant of the SMPS shown in FIG. 1, which uses synchronous rectification.

Power efficiency is, of course, a key consideration in the design of switched mode power supplies and its measure generally dictates the quality of the SMPS. Much research effort has therefore been directed at improving power efficiency. For example, Schottky diodes have extremely small reverse-recovery times and are therefore often used in order to minimize power losses associated with the diode switching. Alternatively, in order to improve the efficiency of the converter shown in FIG. 1 at higher current levels, the diodes D1 and D2 in the secondary side circuit in FIG. 1 can be replaced with a synchronous rectifier circuit comprising transistors, as shown at Q3 and Q4 in the SMPS circuit 200 of FIG. 2. Each of the switching devices Q3 and Q4 can take any suitable or desirable form, and are preferably field-effect transistors in the form of an N-MOSFET or a P-MOSFET, or an IGBT, for example. In the example of FIG. 2, the switch devices Q3 and Q4 have an internal body drain diode, which is not shown in the switch device symbol in FIG. 2. The switching of these transistors is controlled by a controller circuit (not shown), which may or may not be the control circuit controlling the switching of transistors Q1 and Q2.

The principles of operation of the SMPS shown in FIG. 2 will be familiar to those skilled in the art, such that a detailed explanation thereof is unnecessary here. Nevertheless, some of the basics will now be reviewed, to assist understanding of the present invention.

Figure 3:
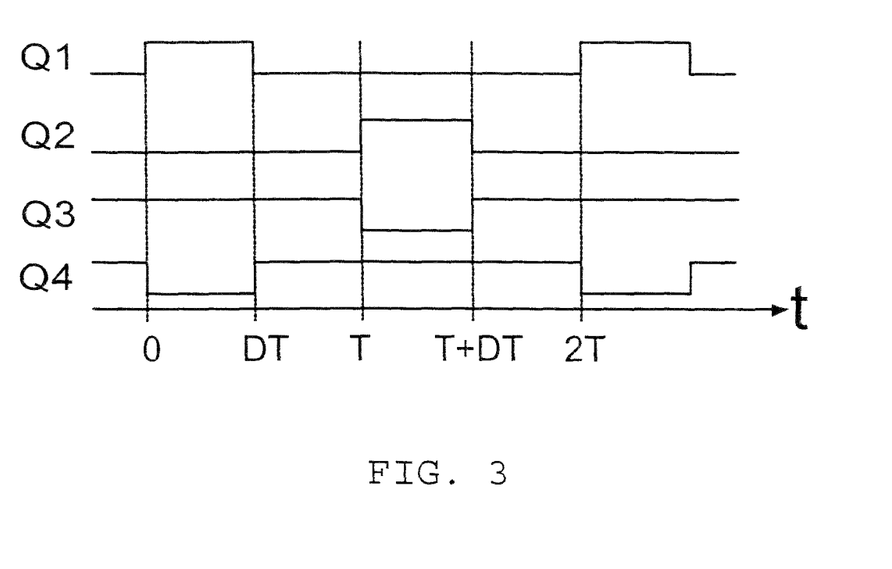
FIG. 3 shows a timing diagram for the circuit of FIG. 2.

FIG. 3 shows the switching cycle diagram in accordance with which the gate electrodes of switches Q1-Q4 in FIG. 2 are driven by the SMPS controller circuit so that the primary side circuit generates a series of voltage pulses to be applied to the primary winding 111 of the transformer 110. In FIG. 3, "D" represents the duty cycle of the switching and "T" the switch period. The operation of the circuit during the four time periods 0 to DT, DT to T, T to (T+DT) and (T+DT) to 2T is as follows.

Time period 1 (0<t<DT): Switching device Q1 is switched ON while Q2 is OFF, allowing the input source at $V_{in}$ to charge capacitors C1 and C2 via the primary winding 111 of the transformer 110. During this period, switching device Q3 is switched ON while device Q4 is switched OFF, allowing the source to transfer energy to the load R via the secondary winding 112 of the transformer 110. The output voltage $V_{out} = n_2/n_1 \cdot V_{in}$, where $n_1$ is the number of turns in the primary winding.

The operation of the half-bridge isolated buck converter of FIG. 2 is to be contrasted with that of a flyback converter (or a combined forward/flyback converter), where energy is stored in an air gap provided in the transformer core during this period, to be subsequently released into the secondary side circuit when the primary winding of the transformer is not being driven. No such air gap is present in the core of transformer 110 shown in FIG. 2 or in any of the related circuits described in the following.

Time period 2 (DT<t<T): Switches Q3 and Q4 are both conducting and the current in the secondary side circuit therefore free-wheels through both portions of the secondary side winding in substantially equal measure, allowing the transformer flux to be balanced. In other words, the free-wheeling current generates two magnetic fluxes within the secondary winding with opposite directions in the vicinity of the centre-tap 113, yielding a net magnetic flux equal to zero in an area between the first and second portions of the secondary winding 112. Hence, the transformer core magnetization is balanced to zero, and the current in the primary winding during the free-wheeling period DT-T/2 is suppressed, thereby avoiding losses in the primary winding. Thus, the transformer volt-second balance is obtained over two switching periods so that a transformer reset is unnecessary.

Time period 3 (T<t<T+DT): In this interval, switching device Q1 is switched OFF while device Q2 is turned ON, allowing the capacitors C1 and C2 to discharge through the primary winding 111, exciting it with a voltage of opposite polarity to that in the first time period described above. On the secondary side, switch Q4 remains ON while switch Q3 is turned OFF, allowing the EMF generated in the lower portion of the secondary winding to drive a current through the inductor L.

Time period 4 (T+DT<t<2T): The operation proceeds as in time period 2 described above.

In order to have the transformer magnetic flux balanced (which is necessary to guard against the magnetizing current becoming large enough to saturate the transformer), the periods for which switches Q1 and Q2 are turned ON should be the same in each switch period. However, where the balance is imperfect, efforts have been focused on avoiding its adverse effects, such as by connecting a capacitor in series with the transformer's primary winding so that any excess voltage is dropped across the capacitor rather than the primary winding. In order to avoid a short circuit of the source or cross-conduction on the primary side, a delay is introduced between the turn-OFF of one switching device and the turn-ON of the other.

Figure 4A:
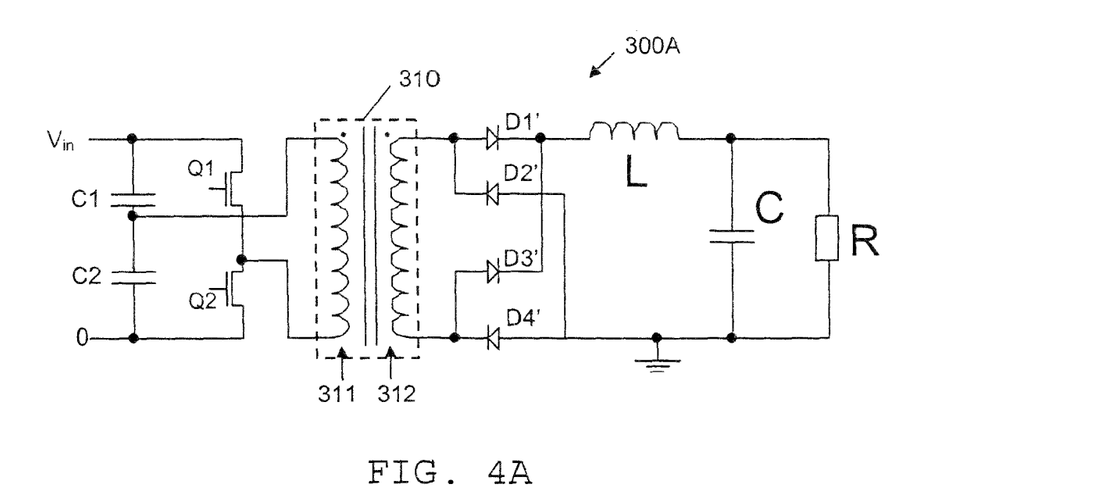
FIGS. 4A and 4B show background examples of an SMPS having full-bridge diode rectification and semi-synchronous rectification, respectively.
Figure 4B:
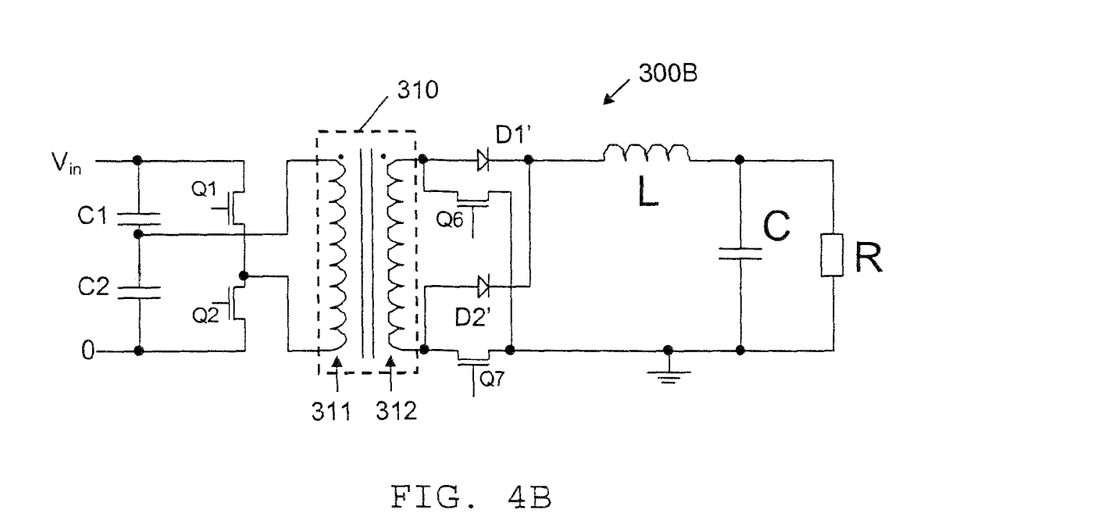

An alternative SMPS topology, with an untapped secondary winding, is shown in FIGS. 4A and 4B. The primary side of the SMPS 300A shown in FIG. 4A is the same as in FIGS. 1 and 2, although a full-bridge, for example, may alternatively be used. However, the secondary side comprises a diode full-bridge rectifying network with diodes D1-D4 connected to the load R via an LC filter. As with the example shown in FIG. 2, variants with semi- or full-synchronous rectification may be used in order to improve the power efficiency. An SMPS 300B with semi-synchronous rectification is shown in FIG. 4B. In both cases, the losses in the SMPS are mainly due to losses in the diodes.

The use of full- or semi-synchronous rectification on the secondary side as mentioned above is just one of the measures available to a designer seeking to improve the system efficiency. Efforts have also been directed to minimising switching and conduction losses in the transistors through the optimization of their structure, and to developing improved control architecture options (e.g. pulse skipping), as well as to reducing trace losses and other parasitics by appropriately integrating the switching devices into an IC package. Steps have also been taken to minimise losses in the passive components of the SMPS. Notably, resistive losses in the inductor windings, losses due to hysteresis and eddy currents in the transformer core, and losses in the capacitors due to their series resistance and leakage, and their dielectric losses, have all been addressed by efforts to improve the design of these components.

Yet despite these efforts, there still remains a need to further improve the power efficiency of the SMPS.

SUMMARY OF THE INVENTION

Since the power loss in the transformer is often so high that it makes the transformer the hot-spot that limits the thermal derating of the SMPS, the present inventors have recognized that it would be particularly desirable to reduce losses in the transformer.

The present inventors have found that significant losses can occur during the free-wheeling time periods of the SMPS's operation, i.e. during periods in which the transformer primary is not being driven so that energy is not being transferred from the primary side circuit to the secondary side circuit. These losses occur mainly in the transformer windings where tapped secondary side full-wave rectification is used, since the magnetic flux is constant during the free-wheeling period. These losses are a combination of DC losses and high-frequency AC losses associated with the free-wheeling current that flows in the secondary-side circuit during the free-wheeling periods. Where an untapped secondary winding with diode rectification or semi-synchronous rectification is used, the losses occur mainly in the diodes.

Departing from the aforementioned conventional approaches to minimising such losses, in which the presence of the free-wheeling current in the transformer windings and the rectifying network is simply accepted and the focus is on the selection or design of individual components to mitigate the losses that it causes, the present inventors have realised that the power efficiency of power supplies of the kinds described above can be improved significantly by reducing the free-wheeling current level in the highly dissipative elements of the circuit in the first place.

As will be explained below through embodiments of the present invention, the free-wheeling current in the transformer secondary and/or the rectifying network can be reduced or eliminated using a switching device that is arranged to conduct at least a part of the free-wheeling current flowing in the secondary side circuit during the free-wheeling period. That is, during the free-wheeling periods, the free-wheeling current can be made to flow through the switching device instead of, or in addition to, flowing through the transformer secondary and/or the rectifying network. The voltage stress over the switching device can be made half that over the switching elements of the rectifying network, making it possible to choose a switching device with a lower voltage rating, which usually has a lower ON-resistance that reduces the power loss accordingly. The reduction in the transformer current and/or the current in the rectifying network during the free-wheeling periods leads to lower losses, thus improving the thermal derating of the SMPS and allowing it to be used with less cooling. This in turn leads to an energy saving in the cooling system.

More specifically, the present invention provides an isolated switched mode power supply, which comprises: a transformer comprising a primary winding and a secondary winding, said secondary winding having a centre-tap provided between a first portion and a second portion thereof. The switched more power supply also includes a primary side circuit arranged to generate voltage pulses and thereby to drive the primary winding of the transformer, and further includes a secondary side circuit. The secondary side circuit comprises a rectification network connected to the secondary winding, the rectification network and the transformer being arranged such that, during a free-wheeling period of operation of the switched mode power supply in which the primary winding is not driven by the primary side circuit, a magnetic flux from the first portion of the winding substantially cancels a magnetic flux from the second portion of the winding between the first and second portions of the winding. The secondary side circuit further comprises a switching device, which is connected to the centre-tap and an output of the rectification network so as to conduct at least a part of a free-wheeling current flowing in the secondary side circuit during said free-wheeling period.

The present invention also provides, as an alternative solution to the problem of reducing the aforementioned losses in an SMPS, a hard-switched, isolated switched mode power supply, comprising: a transformer comprising a primary winding and a secondary winding; a primary side circuit arranged to generate voltage pulses and thereby to drive the primary winding of the transformer; and a secondary side circuit. The secondary side circuit comprises a rectification network connected to the secondary side winding, and also includes a switching device arranged to conduct, in parallel with the rectification network, a free-wheeling current flowing in the secondary side circuit of the power supply during a free-wheeling period of operation of the power supply in which the primary winding is not driven by the primary side circuit.

BRIEF DESCRIPTION OF THE DRAWINGS

Embodiments of the invention, which have different performances in terms of power efficiency and cost, will now be explained in detail, by way of example only, with reference to the accompanying figures, in which.

DETAILED DESCRIPTION OF EMBODIMENTS

First Embodiment

Figure 5A:
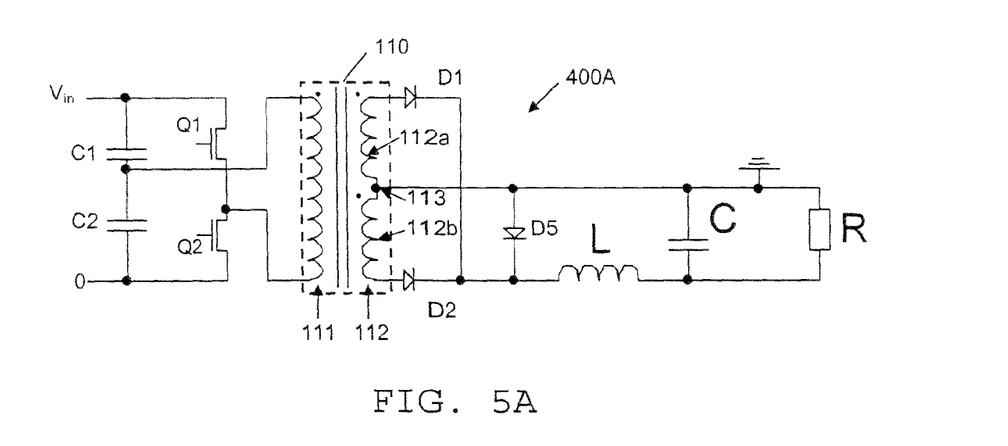
FIG. 5A shows an SMPS according to a first embodiment of the present invention, which uses diode rectification and a free-wheeling diode.

FIG. 5A shows an isolated SMPS 400A according to a first embodiment of the present invention, which differs from the background example shown in FIG. 1 by having a switching device in the form of a diode, D5, provided in the secondary side circuit. The SMPS is otherwise the same as that described above with reference to FIG. 1 and the description of the conventional aspects of its operation will therefore not be repeated here.

In the present embodiment, the centre-tap 113 and the anode of diode D5 are earthed while the cathode of D5 is connected between the cathodes of diodes D1 and D2, and the inductor L, as shown in FIG. 5A. Thus, the diode D5 is connected in the secondary side circuit, between the centre-tap 113 and the output of the rectification circuit, so as to carry the free-wheeling current during the free-wheeling periods and thus reduce the free-wheeling currents in the portions 112a and 112b of the transformer's secondary winding 112, and in diodes D1 and D2 of the rectifying network. In other words, switching device D5 reduces losses in the transformer and diodes D1 and D2 by being arranged to provide a parallel, relatively low-resistance conduction path for the free-wheeling current. The output of this SMPS looks like that of a diode-rectified buck converter.

The circuit of the present embodiment has the advantage of being simple and inexpensive to manufacture, since no control circuitry is required to operate the switching device D5. This circuit is therefore best suited to low-current and low-cost applications, and where the resistance in the secondary side windings is sufficiently large to warrant the addition of the switching device D5. However, whilst the circuit of this embodiment is effective, the energy saving in the converter and the power loss reduction in the transformer will be modest in comparison with some of the alternative embodiments described below.

Figure 5B:
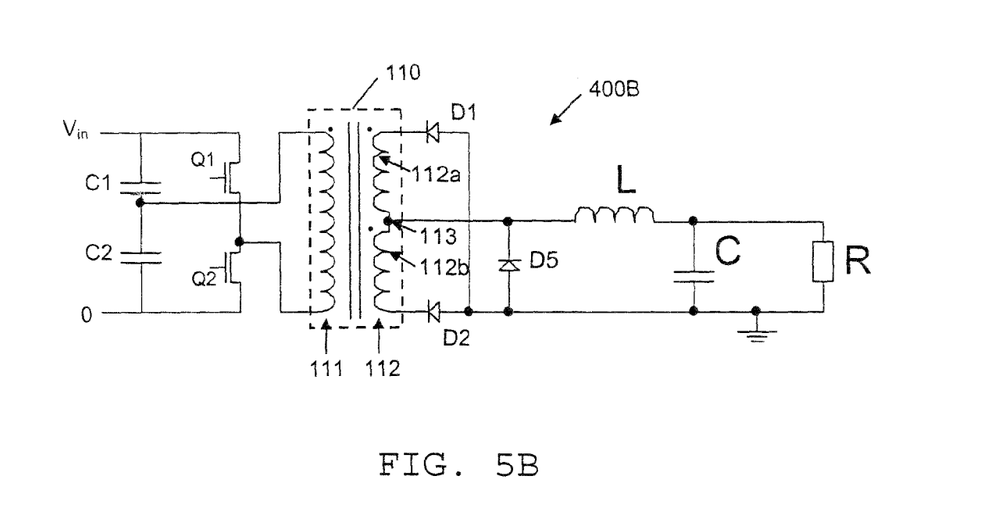
FIG. 5B shows a variant of the SMPS shown in FIG. 5A.

A variant of the SMPS of the first embodiment is shown in FIG. 5B. In the SMPS 400B of this embodiment, the polarities of diodes D1 and D2 are reversed, and the ground reference is provided at the anode of diode D2 rather than being at the centre-tap 113.

Embodiment 2

Figure 6:
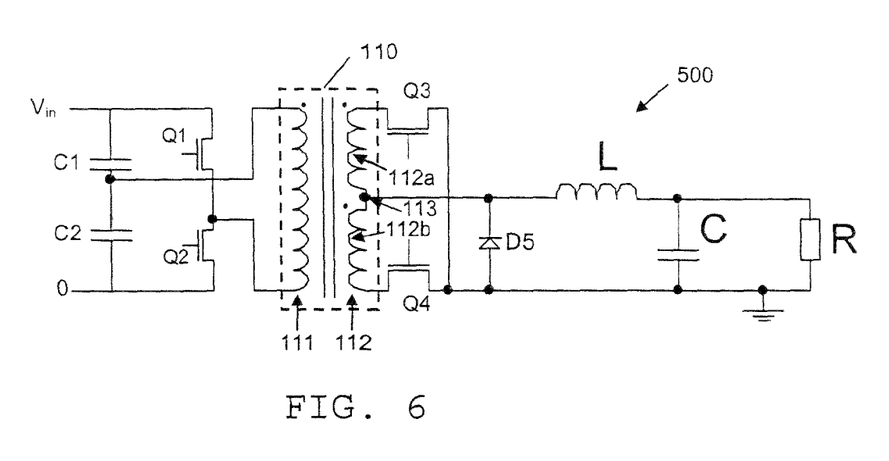
FIG. 6 shows an SMPS according to a second embodiment of the present invention, which uses synchronous rectification and a free-wheeling diode.

FIG. 6 shows an isolated SMPS 500 according to a second embodiment of the present invention, which differs from the background example shown in FIG. 2 by having a switching device in the form of a diode, D5, provided in the secondary side circuit, and by a terminal of each of the transistors Q3 and Q4 (instead of the centre-tap 113) being earthed. This SMPS is otherwise the same as that described above with reference to FIG. 2 and the description of the conventional parts of its operation will therefore not be repeated here.

In the present embodiment, a terminal of each of transistors Q3 and Q4, and the anode of diode D5, are all earthed, while the cathode of D5 is connected between the centre-tap 113 and the inductor L, as shown in FIG. 6. Thus, similarly to the first embodiment, the diode D5 is connected in the secondary side circuit, between the centre-tap 113 and the output of the rectification circuit, so as to carry the free-wheeling current during the free-wheeling periods, thus reducing the free-wheeling currents in the portions 112a and 112b of the transformer's secondary winding 112, and in transistors Q3 and Q4 of the synchronous rectification network. In other words, switching device D5 is arranged to provide a parallel, relatively low-resistance conduction path for the free-wheeling current, thereby reducing losses in the transformer and the transistors.

The circuit of the present embodiment is preferable when using highly resistive, small switching devices Q3 and Q4, or when the secondary winding 112 has a large resistance due to it having many turns and/or thin wires, as compared with the resistance and voltage drop over the free-wheeling diode D5. The circuit is also simple and cost-effective to manufacture since there is no need for any signaling beyond that used in existing circuits of the kind shown in FIG. 2.

The earthing of a terminal of each of the switching devices Q3 and Q4 in the present embodiment makes it easier and cheaper to drive these switches when using N-MOSFETs.

This arrangement is preferable to providing the ground reference at the centre-tap, which requires high-side drivers with boot-strap circuitry.

Embodiment 3

Figure 7A:
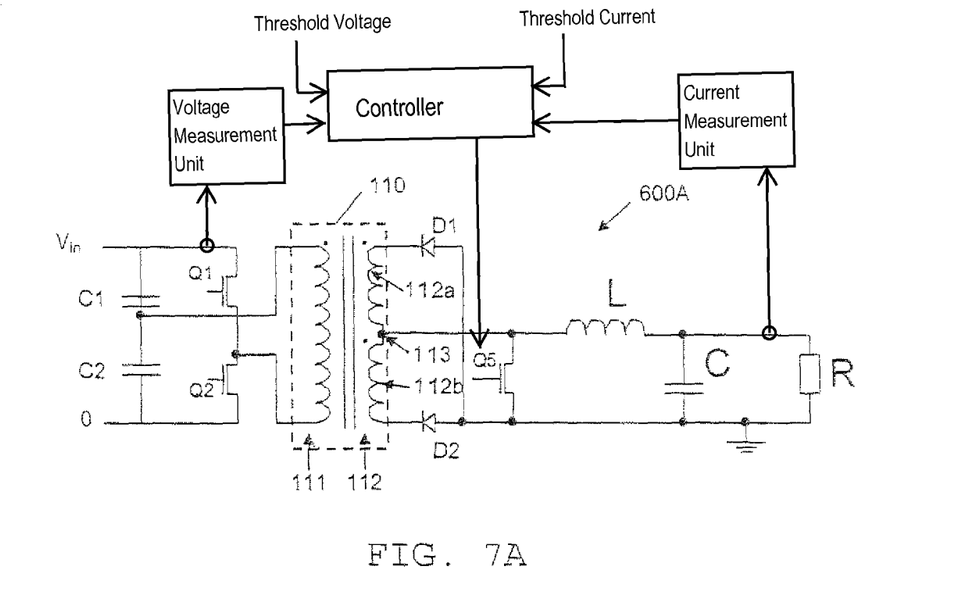
FIG. 7A shows an SMPS according to a third embodiment of the present invention, which uses diode rectification and synchronous free-wheeling.

FIG. 7A shows an isolated SMPS 600A according to a third embodiment of the present invention, which differs from the variant of the first embodiment described above with reference to FIG. 5B by having a switching device in the form of a transistor Q5 (which may, for example, be a field-effect transistor such as a MOSFET or an IGBT) provided in the secondary side circuit, in place of diode D5. This SMPS is otherwise the same as that shown in FIG. 5B and the description of its operation will therefore not be repeated here.

Similarly to the above-described variant of the first embodiment, the transistor Q5 is connected in the secondary side circuit, between the centre-tap 113 and the output of the rectifying network, so as to carry the free-wheeling current during the free-wheeling periods, thus reducing the free-wheeling currents in the portions 112a and 112b of the transformer's secondary winding 112, and in diodes 01 and 02 of the rectification network. In other words, switching device Q5 reduces losses in the transformer and diodes 01 and 02 by providing a parallel, relatively low-resistance conduction path for the free-wheeling current during the free-wheeling periods. The switch Q5 is turned ON and OFF in accordance with control signals generated by a pulse width modulation (PWM) controller. In one embodiment the controller to minimize drawing complexity) is arranged to enable the switching device Q5 to switch only when the input voltage measured by an input voltage measuring unit exceeds a voltage threshold value, or the output current measured by an output current measuring unit exceeds a current threshold value, or both the measured input voltage exceeds the voltage threshold value and the measured output current exceeds the current threshold value. To minimize drawing complexity, the controller, input voltage measuring unit, and output voltage measure unit are shown only in FIG. 7A, but can also be used in the other depicted embodiments.

Replacing the free-wheeling diode D5 in FIG. 5B with the transistor Q5 yields synchronous free-wheeling. The circuit of the present embodiment is better suited to handling larger currents, and especially when the free-wheeling time periods (DT<t<T) and (T+DT<t<2T) are large, hence when the duty cycle D is small. The control and driving of the switching device Q5 is also simple since it has ground as reference, so that no boot-strap circuitry is required. This makes the circuit of the present embodiment suitable for primary-side control, with only one signal needing to be transferred over the isolation barrier. The circuit is therefore most suitable for applications which require low cost, wide input voltage ranges, high output voltages and modest output currents. Furthermore, configuring the switching device Q5 to be self-driven would avoid the need to pass control signals over the isolation barrier, thereby reducing costs further.

Figure 7B:
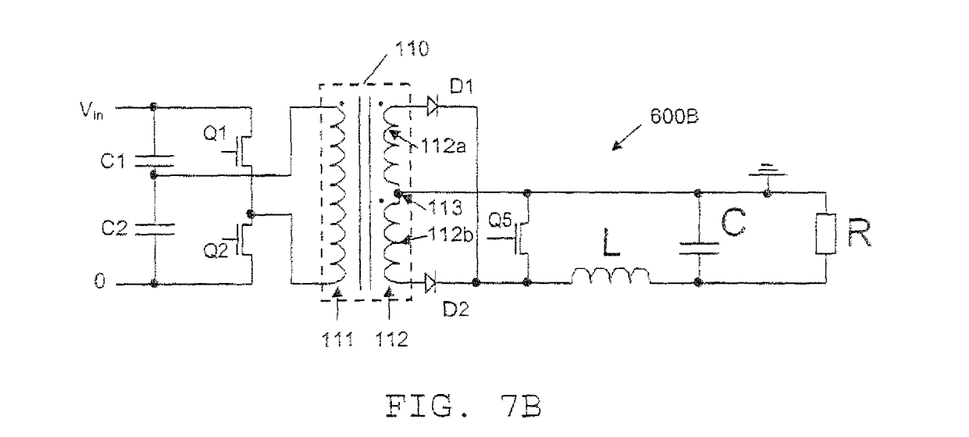
FIG. 7B shows a variant of the SMPS shown in FIG. 7A, where the ground reference is provided at the centre-tap.

FIG. 7B shows a variant of the third embodiment, in which the polarities of diodes D1 and D2 are reversed and the ground reference is provided at the centre-tap 113.

Embodiment 4

Figure 8:
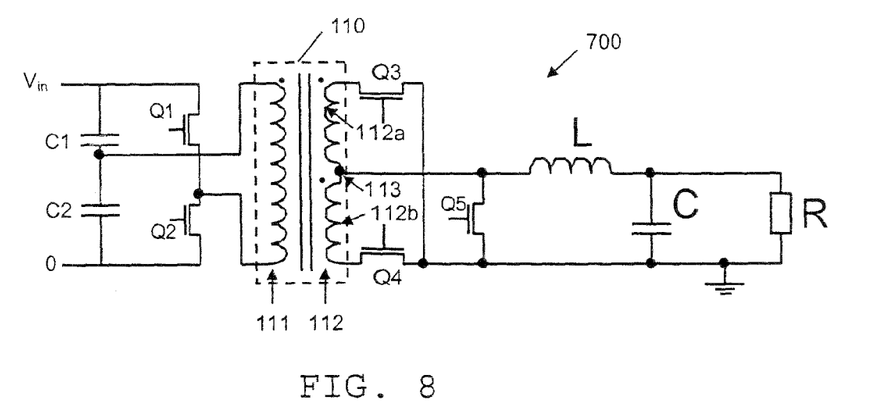
FIG. 8 shows an SMPS according to a fourth embodiment of the present invention, which uses synchronous rectification and synchronous free-wheeling.

FIG. 8 shows an isolated SMPS 700 according to a fourth embodiment of the present invention, which differs from the background example shown in FIG. 2 by having a switching device in the form of a transistor, Q5, connected to the centre-tap 113 and the output of the rectification network, and by a terminal of each of the transistors Q3 and Q4 (instead of the centre-tap 113) being earthed. Such earthing of Q3 and Q4 is preferable since N-MOSFETs can then be used without high-side drivers with boot-strap circuitry, in contrast with the topology in FIG. 2, where the switches Q3 and Q4 are floating. The SMPS 700 of the present embodiment is otherwise the same as that of the background example described above with reference to FIG. 2, and the description of the conventional aspects of its operation will therefore not be repeated here. As with the embodiments and variants thereof described above, the SMPS of the present embodiment is preferably hard-switched.

Similarly to the third embodiment, the transistor Q5 is connected in the secondary side circuit, between the centre-tap 113 and the output of the synchronous rectification network. More specifically, a terminal of each of transistors Q3, Q4 and Q5 is earthed, while the remaining current-carrying terminal of Q5 is connected between the centre-tap 113 and the inductor L, as shown in FIG. 8.

Accordingly, the transistor Q5 is connected so as to carry the free-wheeling current during the free-wheeling periods, thus reducing the free-wheeling currents in the portions 112a and 112b of the transformer's secondary winding 112, and in transistors Q3 and Q4 of the rectification network. In the present embodiment, switching device Q5 is arranged to provide a parallel, relatively low-resistance conduction path for the free-wheeling current, thereby reducing losses in the transformer and in the transistors Q3 and Q4. The switch Q5 is turned ON and OFF in accordance with control signals generated by a PWM controller (not shown).

Using synchronous rectification and synchronous free-wheeling makes the circuit suitable for higher current levels. The control of the switch devices is preferably performed on the secondary side but primary side control is also possible. The switching in the present embodiment may be controlled in two different ways, namely to provide free-wheeling via:

1. both the transformer secondary 112 and switching device Q5, or
2. the switching device Q5 only.

Figure 9A:
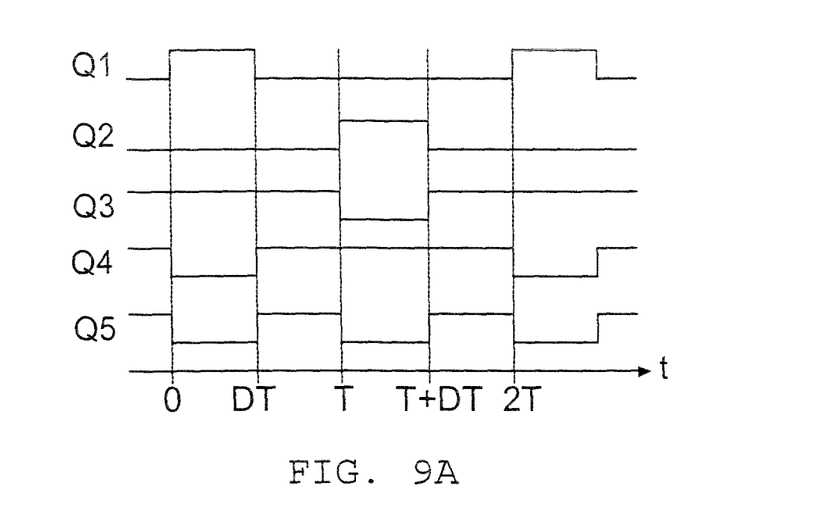
FIGS. 9A and 9B show alternative timing diagrams according to which the SMPS shown in FIG. 8 may operate.
Figure 9B:
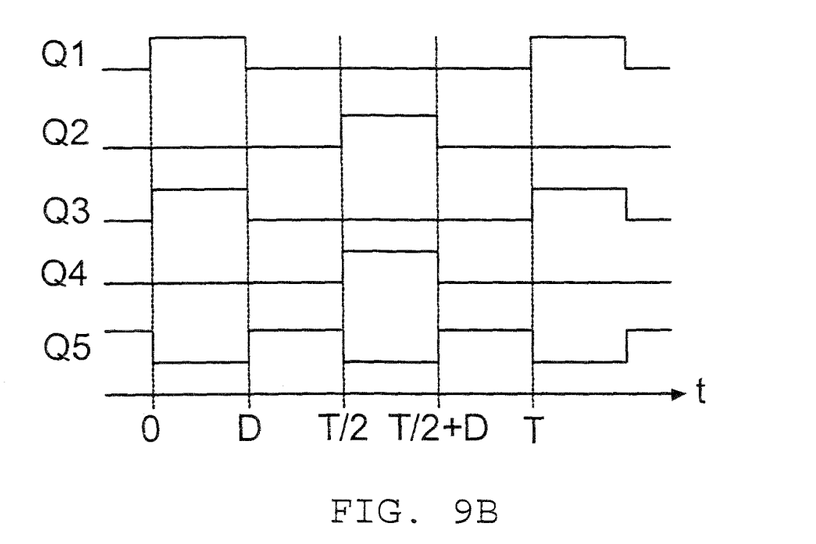

These alternative ways of controlling the switching of transistors Q1-Q5 in the fourth embodiment are illustrated in the timing diagrams of FIGS. 9A and 9B.

FIG. 9A shows the timing diagram in accordance with which free-wheeling is allowed to take place in both the secondary winding 112 of the transformer 110 and the switching device Q5. This is made possible by switching ON transistors Q3, Q4 and Q5 during the free-wheeling periods (DT<t<T) and (T+DT<t<2T). Free-wheeling in both the transformer secondary 112 and the switching device Q5 yields the lowest possible resistance for the free-wheeling current and hence the best possible power efficiency. This timing diagram requires less accurate timing with dead-times between the switching of the synchronous rectification switching devices Q3 and Q4, and the free-wheeling switching device Q5.

However, if the transformer 110 is the hot-spot in the SMPS, it may be preferable to implement free-wheeling via Q5 only, using the timing diagram shown in FIG. 9B. In this timing sequence, Q3 and Q4 are both switched OFF during the free-wheeling periods, while Q5 is switched ON. Since the free-wheeling current is required to flow through Q5 (and not through Q3 and Q4) in the scheme of FIG. 9B, the timing sequence shown requires more accurate handling of the dead times in order not to decrease the power efficiency of the SMPS. The term "dead time" as used herein refers to the (usually very short) time interval (not shown) between Q3 switching OFF, for example at t=DT, and Q5 switching ON shortly thereafter, which is necessary to prevent cross-conduction in the secondary side circuit.

Embodiment 5

Figure 10:
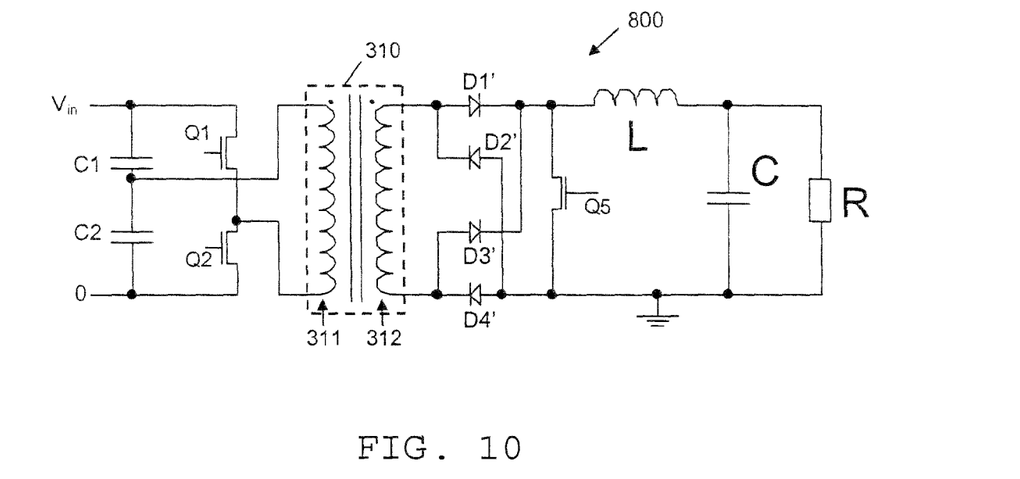
FIG. 10 shows and SMPS according to a fifth embodiment of the present invention, which uses full-bridge diode rectification and synchronous free-wheeling.

FIG. 10 shows an isolated SMPS 800 according to a fifth embodiment of the present invention, which differs from the background example shown in FIG. 4A by having a switching device in the form of a transistor, Q5, provided in the secondary side circuit. The transistor Q5 may, for example, be a field-effect transistor in the form of a P-MOSFET or an N-MOSFET, or an IGBT, and is connected across the outputs of the rectifying network comprising diodes D1' to D4'. The SMPS is otherwise the same as that in the background example which has been described above with reference to FIG. 4A, and the description of the conventional aspects of its operation will therefore not be repeated here.

It is noted that the SMPS of the present embodiment is hard-switched. In other words, in contrast to zero-voltage switching (ZVS) and zero-current switching (ZCS), the switching time instants in each of the switching devices in the present embodiment occur regardless of the current in the device or the voltage over it.

The transistor Q5 is connected in the secondary side circuit, between the ground reference and the output of the rectification network, so as to carry the free-wheeling current during the free-wheeling periods, thus reducing the free-wheeling current in the rectifying network (and, to a lesser extent, in the transformer secondary winding 312). In other words, switching device Q5 reduces losses primarily in the rectifying circuit by providing a parallel, relatively low-resistance conduction path for the free-wheeling current during the free-wheeling periods.

Figure 11:
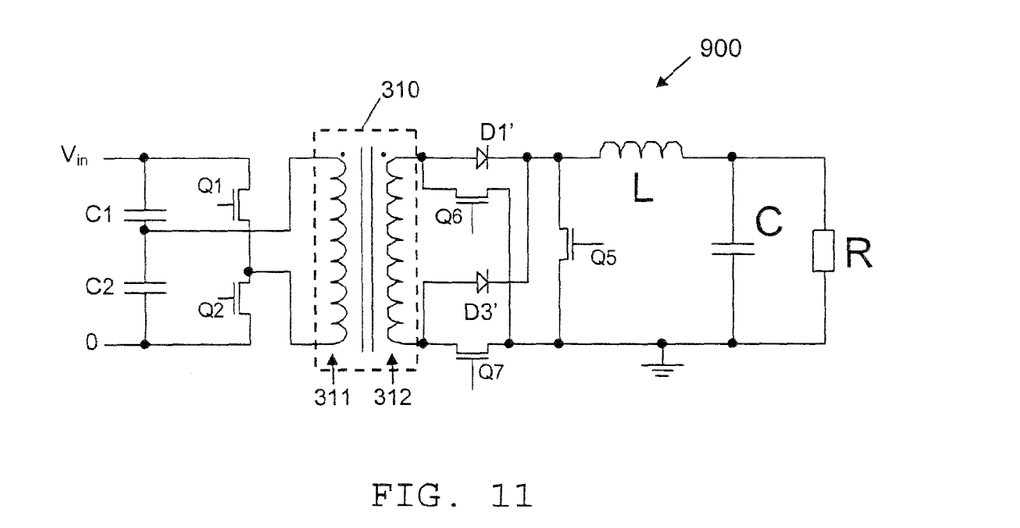
FIG. 11 shows a variant of the SMPS shown in FIG. 10, which uses semi-synchronous rectification.

FIG. 11 shows a more efficient variant of the fifth embodiment, in which two of the diodes (D2' and D4') in the full-wave rectification bridge are replaced with transistor switches (Q6 and Q7). Each of the transistors Q6 and Q7 may be a field-effect transistor such as a P-MOSFET or an N-MOSFET, or an IGBT. The good pre-bias immunity is not destroyed, as the two remaining diodes, D1' and D3', prevent the SMPS from sink current to ground when Q5 is turned OFF during start-up. Using semi-synchronous rectification avoids problems with pre-bias start and costs due to high-side switch device drivers, which are required in full synchronous rectification.

Experimental Results

Figure 12:
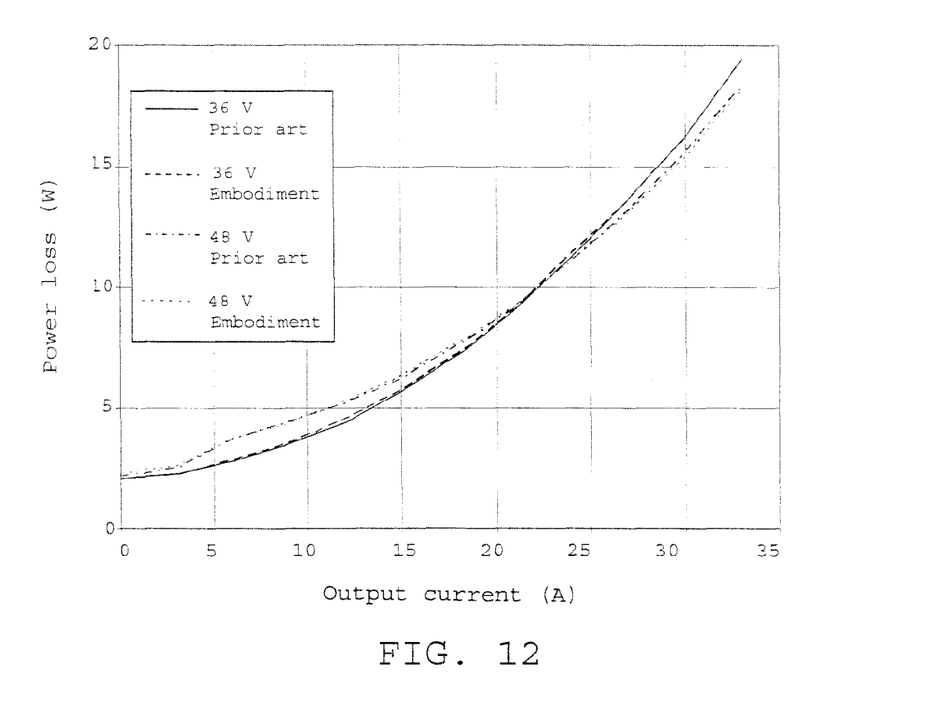
FIGS. 12 and 13 show plots of the power loss vs. load current for different input voltage values for an SMPS with synchronous rectification and a switching device according to an embodiment of the present invention, together with those for a conventional SMPS without such a switching device.

FIG. 12 shows plots of the power loss vs. load current for different input voltage values for an SMPS with a centre-tapped secondary winding, which uses synchronous rectification and a switching device according to an embodiment of the present invention. Corresponding plots for a conventional SMPS not having the switching device are also shown, for comparison.

More specifically, a 400 W full-bridge SMPS with centre-tapped secondary side transformer with synchronous rectification is used as the reference. The converter has an input voltage range of 36 to 75 V and an output voltage of 12 V. The free-wheeling transistor is switched in accordance with the timing shown in 9A. That is, free-wheeling is allowed to occur both in the switching device Q5 and the transformer's secondary winding 112.

In FIG. 12, the power losses are compared using input voltages of 36 V and 48 V. At an input voltage of 36 V, the circuit with the free-wheeling switch device shows a small increase in power loss at light loads but at larger loads the losses are very similar.

At an input voltage of 48 V, the power loss shows the same behavior at light loads but at loads greater than 25 A, the free-wheeling device reduces the power loss. Thus, the plots demonstrate that while the switching device Q5 has little effect when the SMPS input voltage is 36 V, it does decrease the power loss in the SMPS for an input voltage of 48 V, particularly where the output current is above about 25 A.

Figure 13:
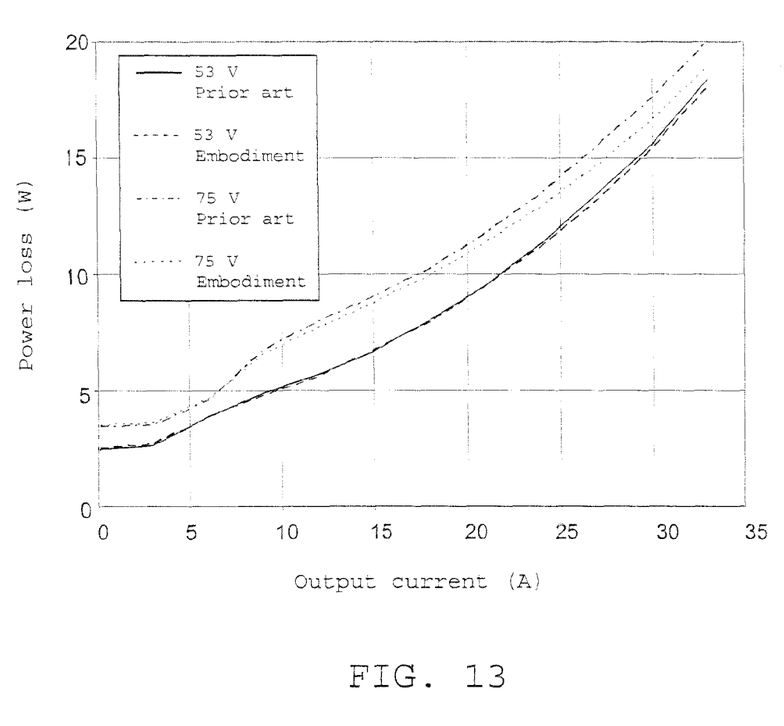

FIG. 13 shows similar plots as FIG. 12, but here the power losses are compared for input voltages of 53 V and 75 V. At an input voltage of 53 V, the power loss shows the same behavior as for the input voltage of 48 V at light loads, but at load currents greater than 22 A, the switching device Q5 has the effect of reducing the power loss. Hence, the load current value at which the efficiency gains due to the switching device Q5 become apparent decreases with increasing input voltage. At an input voltage of 75 V, the reduction in power loss is already apparent at a load of 7 A, and the power loss reduction is observed to increase with increasing load.

Figure 14:
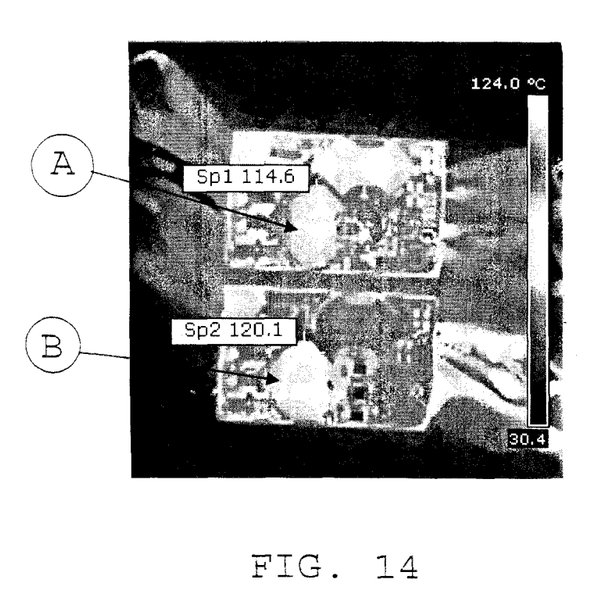
FIG. 14 shows a thermal imaging camera picture of an SMPS with a switching device in accordance with an embodiment of the present invention placed next to an SMPS without such a switching device.

To put these figures into practical context, reference is now made to FIG. 14, which shows a thermo-camera picture of two DC/DC converters; one with, and one without, the free-wheeling switching device Q5. In both cases, the input voltage was set at 75 V and load current at 10 A. FIG. 14 reveals that the transformer (A) of the power supply with a switching device Q5 has a hot-spot (at 114.6° C.) which is over 5° C. cooler than the hot-spot (at 120.1° C.) on the transformer (B) of the conventional power supply. A difference of this size in the operating temperature leads to significant energy savings in the power supply's cooling system.

MODIFICATIONS AND VARIATIONS

Many modifications and variations can be made to the embodiments described above.

For example, the switching device Q5 could be self-driven instead of being driven directly by a PWM controller, as described above.

Although the above-described embodiments employ a half-bridge configuration on the primary side, other well-known topologies may alternatively be used. For example, a full-bridge configuration with four transistors may be more suitable for higher-power applications. Alternatively, a push-pull arrangement can be used.

In light of the experimental results shown in FIGS. 12 and 13, it would be preferable to control the switching device Q5 by a controller so that the device is used only in circumstances where it will reduce the power loss: namely, when the input voltage of the SMPS measured by an input voltage measuring device is above a certain threshold and/or when the load current measured by an output current measuring device is above a certain threshold. The threshold value(s) would, of course, need to be determined for the particular SMPS of interest, using standard power-loss measurement techniques.

The invention claimed is:

1. An isolated switched mode power supply, comprising:
   a transformer comprising a primary winding and a secondary winding, said secondary winding having a centre-tap provided between a first portion and a second portion thereof;
   a primary side circuit arranged to generate voltage pulses and thereby to drive the primary winding of the transformer;

a secondary side circuit comprising:
  a rectification network connected to the secondary winding, the rectification network and the transformer being arranged such that, during a free-wheeling period of operation of the isolated switched mode power supply in which the primary winding is not driven by the primary side circuit, a magnetic flux from the first portion of the secondary winding substantially cancels a magnetic flux from the second portion of the secondary winding between the first and second portions of the secondary winding; and
  a switching device connected to the centre-tap and an output of the rectification network and controllable by a control signal to turn ON so as to conduct at least a part of a free-wheeling current flowing in the secondary side circuit during said free-wheeling period,
a controller arranged to generate the control signal;
an input voltage measuring unit arranged to measure an input voltage to the isolated switched mode power supply; and
an output current measuring unit arranged to measure an output current by the isolated switched mode power supply,
wherein the controller is further arranged to enable the switching device to switch only when:
  the input voltage measured by the input voltage measuring unit exceeds a voltage threshold value, or
  the output current measured by the output current measuring unit exceeds a current threshold value, or
  both the measured input voltage exceeds the voltage threshold value and the measured output current exceeds the current threshold value.

2. The isolated switched mode power supply according to claim 1, wherein said switching device is a transistor.

3. The isolated switched mode power supply according to claim 1, wherein said rectification network comprises:
  a first diode connected to a first end of the secondary side winding; and
  a second diode connected to said first diode and to a second end of the secondary winding opposite to the first end.

4. The isolated switched mode power supply according to claim 1, wherein said rectification network comprises:
  a first transistor connected to a first end of the secondary side winding; and
  a second transistor connected to said first transistor and to a second end of the secondary winding opposite to the first end.

5. The isolated switched mode power supply according to claim 4, wherein a terminal of each of said first and second transistors is earthed.

6. The isolated switched mode power supply according to claim 4, further comprising a controller arranged to control an ON/OFF state of the first and second transistors so that both of the transistors are switched ON during the free-wheeling period.

7. The isolated switched mode power supply according to claim 4, further comprising a controller arranged to control the ON/OFF state of the first and second transistors so that the first and second transistors are switched OFF during the free-wheeling period.

8. A hard-switched, isolated switched mode power supply, comprising:
  a transformer comprising a primary winding and a secondary winding;
  a primary side circuit arranged to generate voltage pulses and thereby to drive the primary winding of the transformer;
  a secondary side circuit comprising:
    a rectification network connected to the secondary winding; and
    a switching device arranged to conduct, in parallel with the rectification network, a free-wheeling current flowing in the secondary side circuit of the isolated switched mode power supply during a free-wheeling period of operation of the power supply in which the primary winding is not driven by the primary side circuit,
  a controller arranged to generate a control signal to turn the switching device ON so as to conduct the free-wheeling current during the free-wheeling period;
  an input voltage measuring unit arranged to measure the input voltage to the switched mode power supply; and
  an output current measuring unit arranged to measure an output current by the isolated switched mode power supply,
  wherein the controller is further arranged to enable the switching device to switch only when:
    the input voltage measured by the input voltage measuring unit exceeds a voltage threshold value, or
    the output current measured by the output current measuring unit exceeds a current threshold value, or
    both the measured input voltage exceeds the voltage threshold value and the measured output current exceeds the current threshold value.

9. The isolated switched mode power supply according to claim 8, wherein said switching device is a transistor.

10. The isolated switched mode power supply according to claim 8, wherein said rectification network comprises four diodes connected to the secondary winding in a full-bridge rectifier configuration.

11. The isolated switched mode power supply according to claim 8, wherein said rectification network comprises two diodes and two transistors connected to the secondary winding in a full-bridge rectifier configuration, wherein the two diodes are arranged so as to prevent the secondary side circuit of the isolated switched mode power supply from sinking current when the switching device is switched OFF.

* * * * *